United States Patent
Campbell et al.

(10) Patent No.: US 6,808,228 B1
(45) Date of Patent: Oct. 26, 2004

(54) DAMPER STIFFENER EXTENSION AND BOX-BEAM PARCEL SHELF

(75) Inventors: Shawn W. Campbell, Raymond, OH (US); Aron K. Madsen, Raymond, OH (US); Anthony J. Leanza, Raymond, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/631,249

(22) Filed: Jul. 31, 2003

(51) Int. Cl.[7] ............................................. B62D 27/02
(52) U.S. Cl. ............................. 296/193.02; 296/24.44; 296/30; 296/187.11; 296/187.12; 296/193.05; 296/198
(58) Field of Search ............................. 296/30, 24.43, 296/24.44, 187.11, 187.12, 191, 193.02, 193.05, 198, 203.03, 203.04

(56) References Cited

U.S. PATENT DOCUMENTS

| 4,234,225 A | * | 11/1980 | Harasaki et al. | 296/203.04 |
|---|---|---|---|---|
| 5,074,587 A | * | 12/1991 | Schwede et al. | 280/781 |
| 5,123,696 A | * | 6/1992 | Watari | 296/203.04 |
| 5,207,453 A | * | 5/1993 | Stedman et al. | 280/808 |
| 5,411,311 A | * | 5/1995 | Shimmell et al. | 296/203.02 |
| 5,580,121 A | * | 12/1996 | Dange et al. | 296/181.4 |
| 5,788,322 A | * | 8/1998 | Wolf et al. | 296/181.4 |
| 6,010,181 A | * | 1/2000 | Robbins et al. | 296/203.04 |
| 6,113,180 A | * | 9/2000 | Corporon et al. | 296/203.04 |
| 6,241,309 B1 | * | 6/2001 | Roehl et al. | 296/203.04 |
| 2004/0080188 A1 | * | 4/2004 | Igarashi et al. | 296/203.04 |

FOREIGN PATENT DOCUMENTS

JP          62085769 A  *  4/1987  ................. 296/198

* cited by examiner

Primary Examiner—D. Glenn Dayoan
Assistant Examiner—Paul Chenevert
(74) Attorney, Agent, or Firm—Jason H. Foster; Kremblas, Foster, Phillips & Pollick

(57) ABSTRACT

A structurally reinforced automobile body including damper stiffener extensions extending from the damper stiffeners to automobile body members rearward of the damper stiffeners, preferably opposite sides of the rear panel, the side panel outer extensions, the side panel outers or the rear frame members. A box-beam parcel shelf mounts at opposite sides to the region of the automobile body to which a suspension component attaches, such as the wheel house or rear inner panel. The box-beam parcel shelf substantially rigidities the automobile body, especially in combination with the damper stiffener extensions, which together form a contiguous structural reinforcement with the rear panel.

18 Claims, 6 Drawing Sheets

DAMPER STIFFENER EXTENSION AND BOX-BEAM PARCEL SHELF

BACKGROUND OF THE INVENTION

1. Field of the Invention

This invention relates generally to automobile bodies, and more particularly to an automobile body reinforcement member.

2. Description of the Related Art

Automobile bodies are made up of a plurality of structural members, mostly made of steel, that are attached together to provide the framework to which the mechanical components, such as the drive train and suspension, mount. Some automobile bodies have a central structural frame with rigid and heavy steel channels to which all other body parts attach. It has also been understood for some time that unit-body (unibody) automobile bodies are advantageous. Unibody automobile bodies have no separate central frame, but form a structural framework for the mechanical components by rigidly attaching thin metal body panels together with thicker reinforcement members to form a body that is very strong and light.

Because of safety concerns, unibody automobiles are occasionally modified by adding structural reinforcement members to weaker areas or areas prone to permit harm to come to the occupants of the automobile in the event of a crash. These reinforcement members strengthen the body in the area where they will provide the most crash protection. These reinforcing members are added during manufacture in such a way that they are hidden from the consumer by the visible parts of the automobile body, such as the exterior body panels.

There is a need for structural reinforcements that not only make the automobile body stronger to protect occupants in the event of a crash, but also increase the resistance to torsion and bending, especially at the rear of the automobile, but also at the front.

BRIEF SUMMARY OF THE INVENTION

The invention is an automobile body having improved resistance to torsional deformation. Significant torsional deformation, also called body twist, can affect the way an automobile handles, and one object of the invention is to reduce the amount of such deformation for a given force. The automobile body comprises a left rear inner panel on a left side of the automobile and a right rear inner panel on a right side of the automobile. A left damper stiffener is rigidly attached to the left rear inner panel near a left point of attachment to the body of an automobile suspension. The left damper stiffener reinforces the automobile body around the point of attachment of the suspension component. A right damper stiffener is rigidly attached to the right rear inner panel near a right point of attachment to the body of an automobile suspension for the same reason as the left damper stiffener.

A left damper stiffener extension extends from rigid attachment to the left damper stiffener to rigid attachment to a body member positioned rearward of the damper stiffener, such as the rear panel, the side panel outer, side panel outer extension and/or rear frame member. A right damper stiffener extension extends from rigid attachment to the right damper stiffener to rigid attachment to a body member positioned rearward of the damper stiffener.

In one embodiment of the invention, these automobile body members are combined with a box-beam parcel shelf rigidly mounted at a left side to the left rear inner panel and at a right side to the right rear inner panel. The combination of the damper stiffener extensions, the box-beam parcel shelf and the rear panel of the automobile body forms an extremely rigid unit that significantly reduces automobile body torsional and bending deformation and thereby gives a more rigid structure for the suspension to cooperate with.

In another embodiment of the invention, the box-beam parcel shelf is mounted, without the damper stiffener extensions, to a left rear inner panel on a left side of the automobile and a right rear inner panel on a right side of the automobile. The box-beam parcel shelf alone adds significantly to the torsional rigidity of the automobile body.

Figure 1:
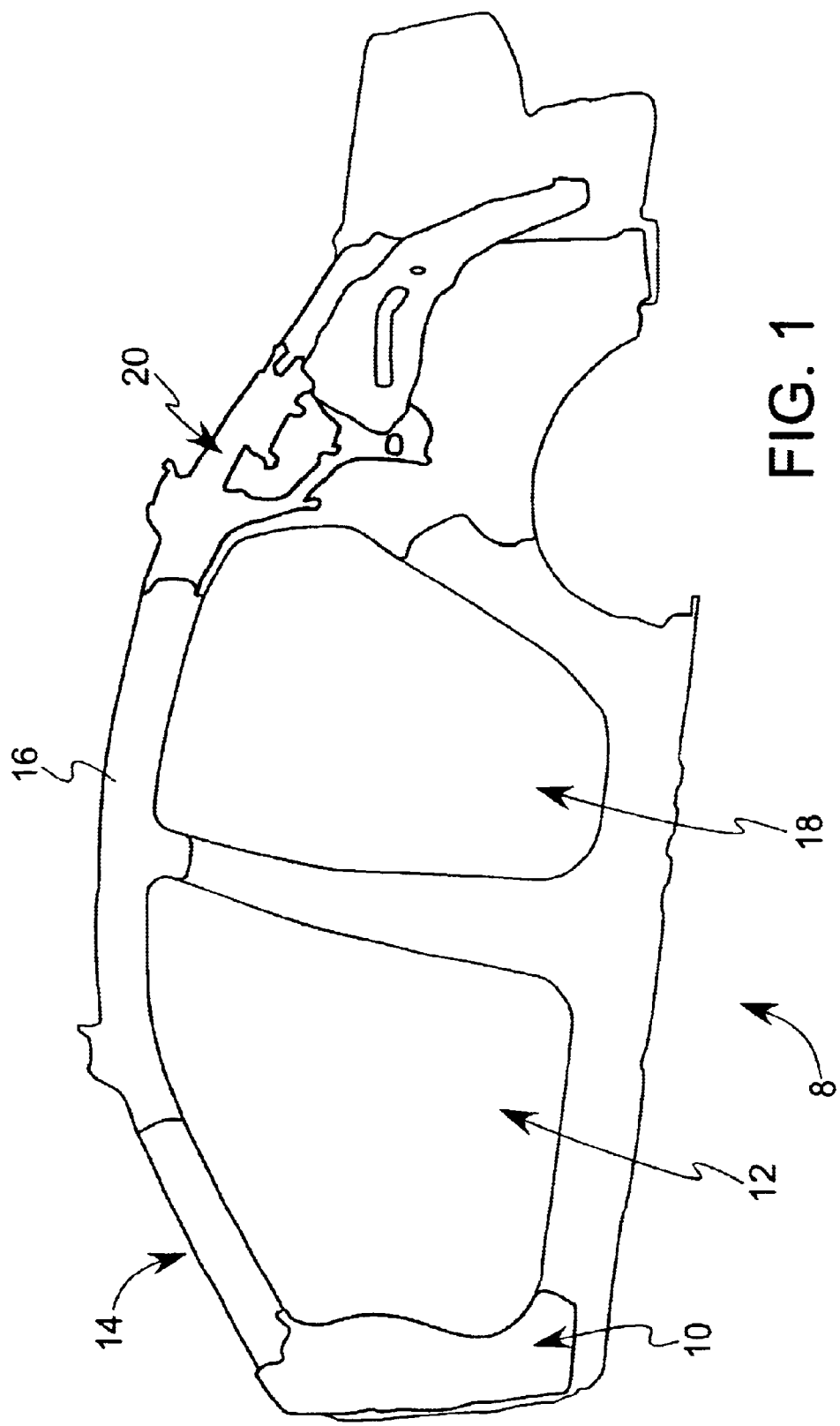
FIG. 1 is a side view illustrating an automobile body with an embodiment of the invention incorporated into the body.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The side of an automobile body 8 is shown in FIG. 1 having sections of the outer body cut away to expose internal members. The body 8 is made of thin metal panels welded, and possibly also bolted or otherwise attached, together. There are a number of rigidifying reinforcement members welded to the thinner metal panels in order to increase the local strength of the automobile body. For example, the front pillar stiffener lower 10 is incorporated into the automobile body at the front of the opening 12 for the front door, preferably by welding to the metal body member beneath it. The front pillar stiffener lower 10 provides locally increased stiffness to the automobile body 8. The front pillar stiffener upper 14 is preferably welded to the body member above the opening 12 for the front door, and the roof side rail 16 is preferably welded to the body member above the opening 18 for the rear door.

Figure 2:
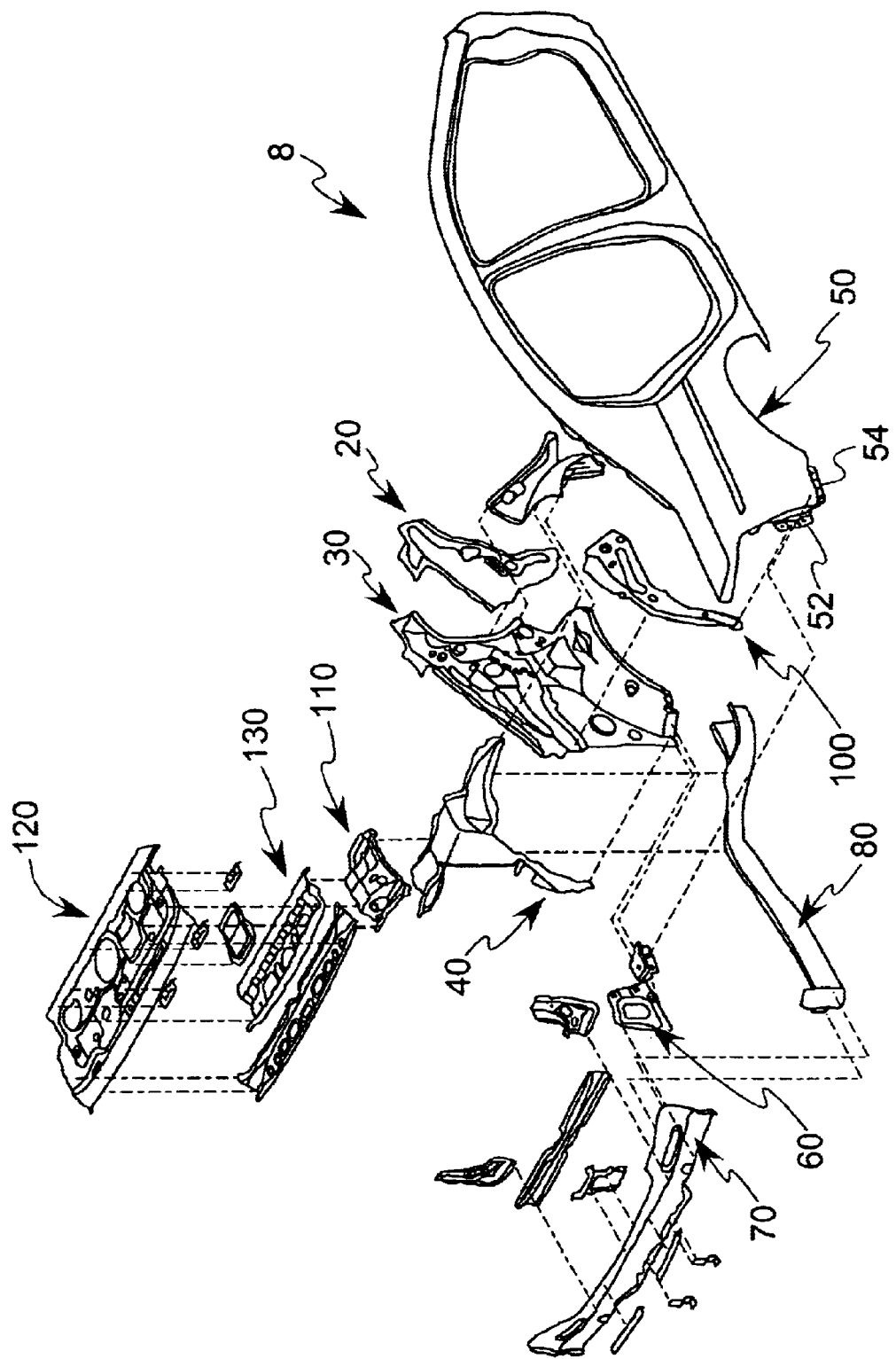
FIG. 2 is an exploded view in perspective illustrating an automobile body incorporating an embodiment of the invention.

The damper stiffener 20 is preferably welded to a body member at the back of the opening 18 for the rear door. The damper stiffener 20 is another rigidifying reinforce member incorporated into the automobile body 8 for the purpose of strengthening the automobile body 8. As best seen in FIG. 2, which is a view of the same automobile body 8, but from the opposite side and with all of the automobile body components separated, the damper stiffener 20 attaches to the rear inner panel 30. The rear inner panel has a wheel house 40 to which a component of the suspension, such as a shock absorber, strut or other linkage, is mounted.

In the context of the present application, the term "mounted" is not limited to direct connection between two parts, but can include connection through another part that is directly attached to the two parts. This definition arises from the fact that it is possible to combine multiple body components described herein as separate into one part, or separate single body components into multiple parts. Such modifications would, generally, increase the cost and complexity of manufacture. However, such modifications are possible, as will be understood by a person of ordinary skill in the technology.

For example, the description that a suspension component is "mounted" to the wheel house 40 includes a structure in which a suspension component is directly attached to the rear inner panel 30 that is directly attached to the wheel house 40 shown in FIG. 2. The term "mounted" includes such direct attachment, but is not limited to it. The automobile body 8 is reinforced by the damper stiffener 20, whether there is direct attachment of the body parts or attachment through other body parts, due to the forces applied to the automobile body 8 by the suspension component.

The side panel outer 50 is the exterior body panel of the rear of the automobile body 8, which is also often referred to as the rear quarter panel or fender.

At its extreme rear region, the side panel outer 50 has a rear flange 52 and a lower flange 54 to which the side panel outer extension 60 is preferably mounted, preferably by welding.

The automobile body 8 is, at least in the rear half of the automobile, substantially symmetrical. This means that the components described above as being on the right side of the automobile body 8 have corresponding mirror-image components on the left side of the automobile body 8. At the extreme rear of the automobile body 8, however, the rear panel 70 extends between the extreme rear regions of the sides of the automobile, and mounts at its right side to the side panel outer extension 60, and at its left side to another side panel outer extension at the left side of the automobile body 8 (not visible in FIG. 2). The rear panel 70 is a strong, structural member to which a rear frame member 80, and its corresponding mirror-image image rear frame member, which is not visible in FIG. 2, mount, preferably by direct attachment, such as welding. The rear frame members are structural members which mount to the floor of the automobile body 8 and provide substantial rigidity to the automobile body 8. The automobile bumper mounts to the rear panel 70, and the rear frame members combine with the rear parts of the automobile body 8 to resist deflection of the bumper toward the occupants of the automobile, such as during the impact of a crash.

It will become apparent from the present description that the automobile body 8 has structural reinforcements extending from the front pillar of the automobile body 8 to the damper stiffener 20, which reinforces the automobile body 8 at the mounting points of the rear suspension components to the automobile body 8. Furthermore, the rear panel 70 and the frame members 80 combine with other automobile body components to form a structurally rigid portion of the automobile body 8.

The damper stiffener extension 100 is rigidly mounted at its front end to the damper stiffener 20, such as by direct attachment and welding. The damper stiffener extension 100 is mounted to the rear inner panel 30, such as by direct attachment and welding. The damper stiffener extension 100 is also mounted to an automobile body member rearward of the damper stiffener 20. In one embodiment, the automobile body member rearward of the damper stiffener 20 to which the rearward end of the damper stiffener extension 100 is mounted is the side panel outer extension 60, which is welded to the rear flange 52 of the side panel outer 50. This is not the most preferred point of attachment, although it has shown noticeable improvement in automobile body resistance to torsional and bending deformation, because the point of attachment at the flange 52 and the side panel outer extension 60 is not in the automobile body's most structurally rigid region. However, the side panel outer extension 60 is directly attached to the rear panel 70, which, in combination with the rear frame members 80, is one of the automobile body's most structurally rigid regions. Therefore, it is most preferred to mount the rearward end of the damper stiffener extension 100 to the rear panel 70 and/or the rear frame member 80, either directly or through another body part that is closely located to the rear panel 70.

Figure 6:
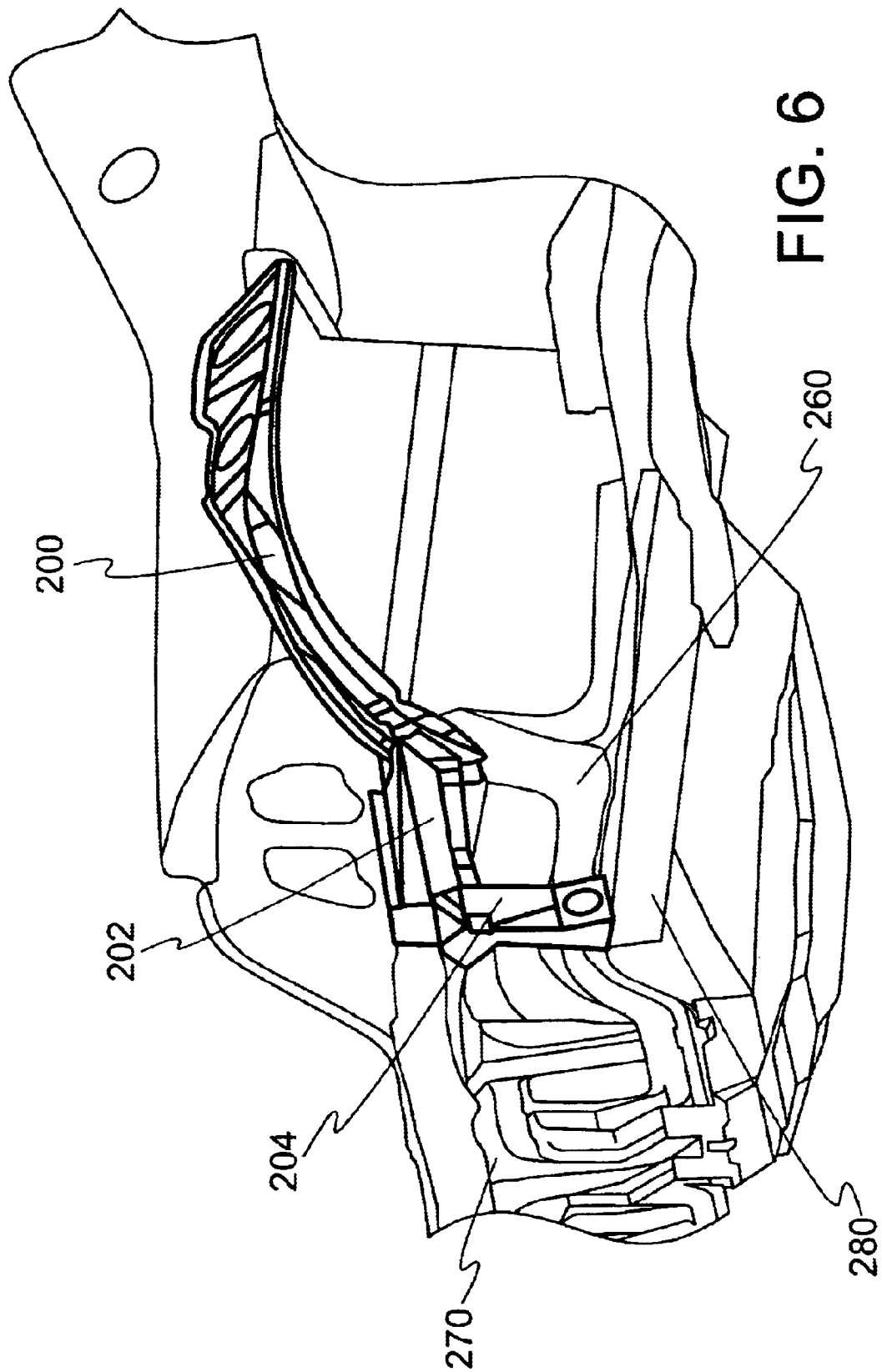
FIG. 6 is a view in perspective illustrating one alternative embodiment of the present invention.

In an embodiment shown in FIG. 6, the rearward end of the damper stiffener extension 200 is directly attached to the rear panel 270, by the portion 202 of the damper stiffener extension 200, near where the side panel outer extension 260 attaches to the rear panel 270. This results in an improved automobile body that is highly advantageous over the existing automobile body. In this embodiment, the rearward end of the damper stiffener extension 200 is also directly attached to the frame member 280 by the portion 204.

By extending the damper stiffener extension 100 between rigid attachment to the damper stiffener 20 and mounting to the rear panel 70, such as by direct attachment or through other body parts that are directly attached to the rear panel 70, the torsional and bending rigidity of the automobile body 8 is substantially enhanced. This increase in rigidity is due to the fact that the automobile body 8 has an essentially contiguous rigidifying reinforcement member extending from the front pillar of the automobile body 8 to the rear panel 70. Therefore, when the suspension components attached to the automobile body 8 at the rear of the automobile are forced upwardly or downwardly by the automobile moving over a road surface, the force applied to the automobile body 8 by the suspension component is transferred by the damper stiffener 20 to the damper stiffener extension 100, and along the length of the damper stiffener extension 100 to the rear panel 70. Because the rear panel 70 connects both left and right sides of the automobile body 8, the automobile body 8 with the damper stiffener extension 100 moves more as a rigid unit than without the damper stiffener extension 100. Without the damper stiffener extension 100, the body twists and/or bends more when the same force is applied by the suspension components than with the damper stiffener extension 100, and this twisting and/or bending affects the handling of the automobile.

Figure 3:
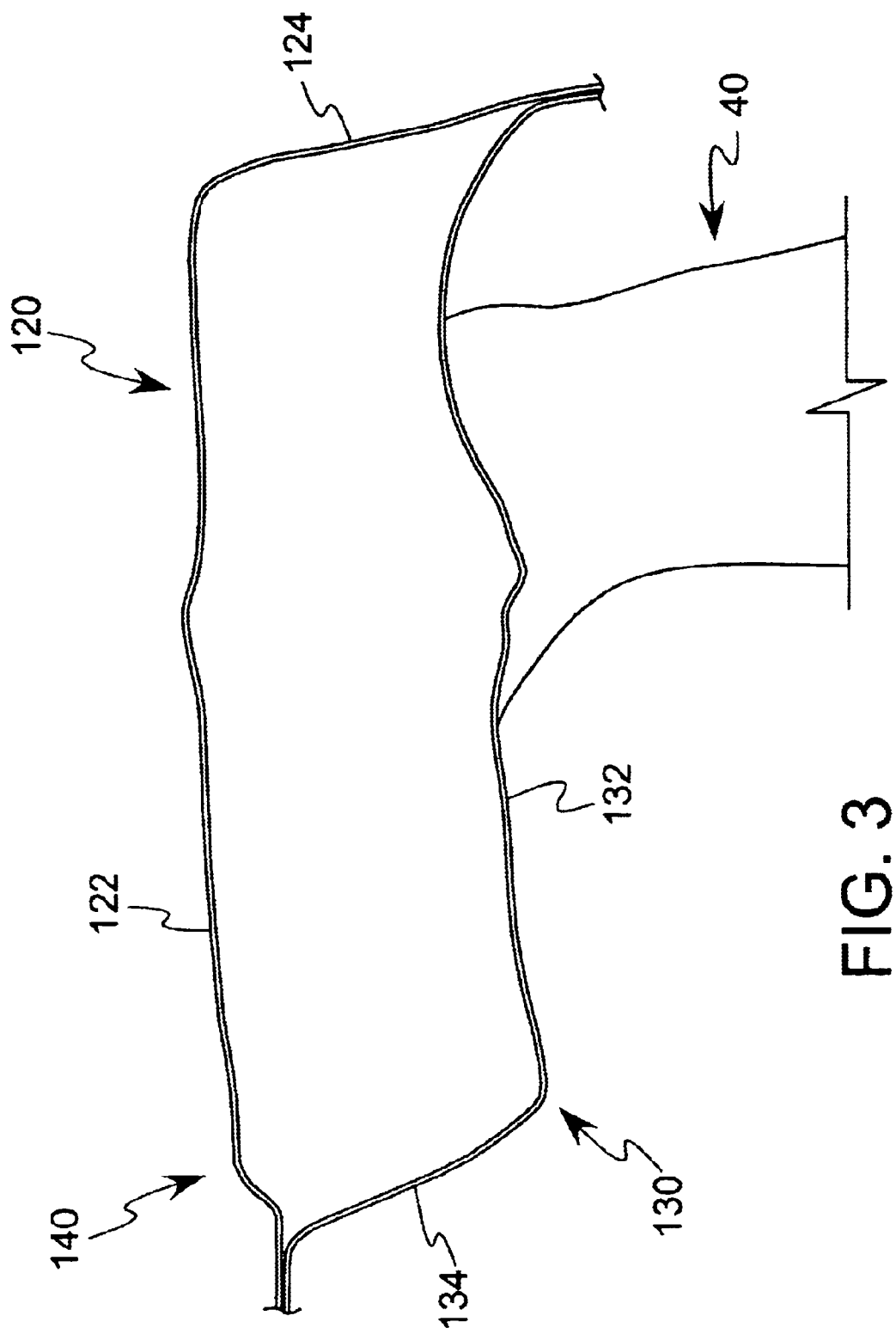
FIG. 3 is a side view in section illustrating the box-beam parcel shelf.
Figure 4:
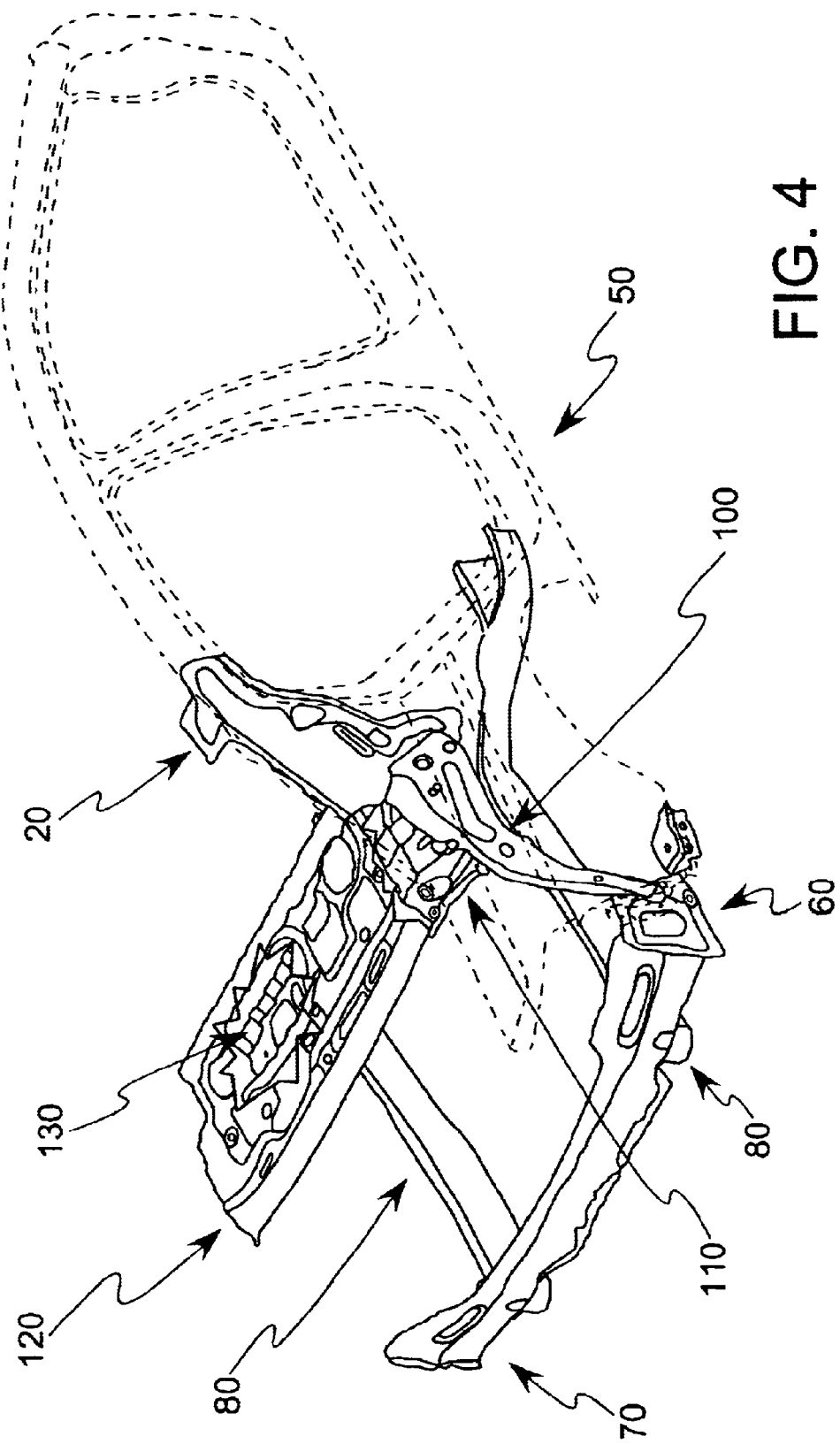
FIG. 4 is a view in perspective illustrating an embodiment of the invention.
Figure 5:
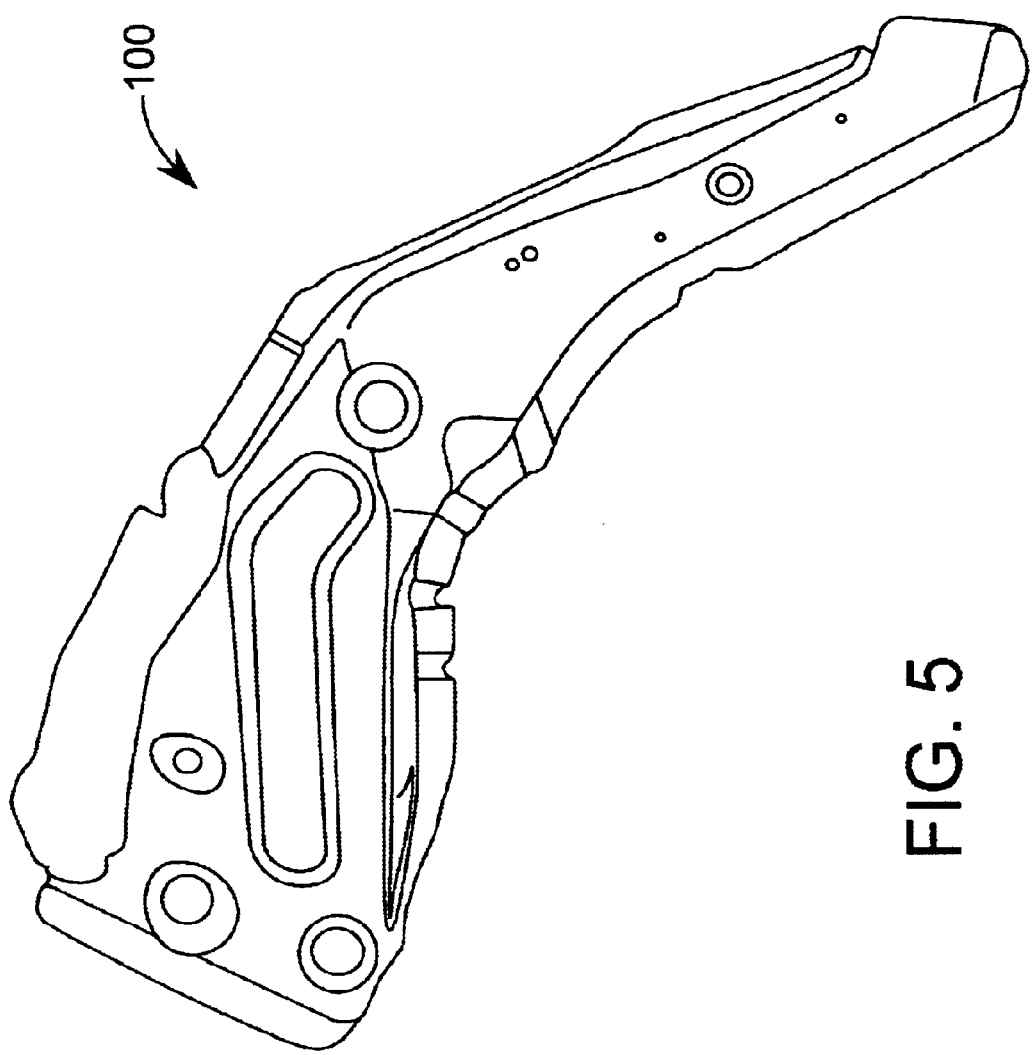
FIG. 5 is a plan view illustrating the preferred embodiment of the invention.

At the upper end of the wheel house 40, a suspension component mounts to the automobile body 8 as described above and as shown in FIGS. 2 and 3. A parcel shelf support 110 mounts to the upper end of the wheel house 40, preferably by welding. A parcel shelf 120 and shelf member 130 attach at a right side to the parcel shelf support 110 There is a mirror-image shelf support on the left side of the automobile body 8, to which the left side of the parcel shelf 120 and shelf member 130 attach.

The parcel shelf 120 and the shelf member 130 form a box-beam parcel shelf 140, which provides a substantial reinforcement to the automobile body 8, thereby reducing torsional deformation of the automobile body 8. The box-beam parcel shelf 140 has upper and lower panel members 122 and 132, respectively, which form its top and bottom, in the orientation shown in section in FIG. 3, and the front and rear panel members 134 and 124, respectively, which adjoin the upper and lower panels 122 and 132 at lateral edges. The members 122, 124, 132 and 134 can be separate components that are subsequently attached together, or a single panel bent in several places to form a box-beam. Preferably the members are different portions of the metal panels that make up the parcel shelf 120 and shelf member 130. The members 122 and 124 are, therefore, different portions of the parcel shelf 120 and the members 132 and 134 are different portions of the shelf member 130. The members 122 and 124 are separated by a bend in the metal panel that forms the parcel shelf 120 and the members 132 and 134 are separated by a bend in the metal panel that forms the shelf member 130.

The box-beam parcel shelf 140 has the advantages of a box beam, and is therefore much more rigid than a conventional single panel that is used as a parcel shelf in conventional automobile bodies. The panel members 122, 124, 132 and 134 are spaced substantially from one another, which increases the strength of the box-beam parcel shelf 140 over a single panel parcel shelf. A contemplated distance between the upper and lower members is between about one and six inches, preferably about two to three inches.

The box-beam parcel shelf 140 is mounted to the upper region of the wheel house structure on the left and the right sides of the automobile body 8. By mounting the rigid box-beam parcel shelf 140 to each side of the automobile body 8 where the force is applied by the suspension, the automobile body 8 is greatly rigidified. Additionally, when the box-beam parcel shelf 140 is combined with the damper stiffener extension 100 and a mirror-image damper stiffener extension (not shown) on the opposite side of the automobile body 8, there is a combination of rigidifying structures that complement one another. The damper stiffener extensions, the rear panel and the box-beam parcel shelf form a contiguous structure at the rear of the automobile that substantially improves torsional rigidity due to its substantial rigidity. On the preferred reinforced automobile body 8, the damper stiffener extensions on opposite sides attach directly and rigidly to the respective damper stiffeners, which attach directly and rigidly to the inner panels, which attach directly and rigidly to the wheel houses, which attach directly and rigidly to the parcel shelf supports, which attach directly and rigidly to the box-beam parcel shelf. The rear ends of the damper stiffener extensions mount to the rear panel, in one embodiment by direct attachment to the side panel outer and the side panel outer extension, and in a preferred embodiment attach directly to the rear panel. Thus, any twisting or bending force exerted at the rear of the automobile body 8 has to distort this contiguous reinforcing structure in addition to the other parts of the automobile body 8.

The terms for automobile body components described herein are not necessarily terms that are standard in the automobile manufacturing industry. For example, the component that the Applicants refer to as a "damper stiffener" may be given a different term by another inventor. However, the components of automobile bodies are similar between most manufacturers. Therefore, the Applicants have described and shown the automobile body and its components using descriptive terminology with the understanding that this terminology encompasses automobile body components otherwise named, but which accomplish the purpose of the Applicants' components.

While certain preferred embodiments of the present invention have been disclosed in detail, it is to be understood that various modifications may be adopted without departing from the spirit of the invention or scope of the following claims.

What is claimed is:

1. An automobile body having improved resistance to torsional deformation, the body comprising:
   (a) a left panel on a left side of the automobile;
   (b) a right panel on a right side of the automobile;
   (c) a left damper stiffener rigidly attached to the left panel near a left point of attachment to the body of an automobile suspension;
   (d) a right damper stiffener rigidly attached to the right panel near a right point of attachment to the body of an automobile suspension;
   (e) a left damper stiffener extension extending from rigid attachment to the left damper stiffener to rigid attachment to a body member positioned rearward of the damper stiffener, wherein the body member is a side panel outer;
   (f) a right damper stiffener extension extending from rigid attachment to the right damper stiffener to rigid attachment to a body member positioned rearward of the damper stiffener.

2. An automobile body having improved resistance to torsional deformation, the body comprising:
   (a) a left panel on a left side of the automobile;
   (b) a right panel on a right side of automobile;
   (c) a left damper stiffener rigidly attached to the left panel near a left point of attachment to the body of an automobile suspension;
   (d) a right damper stiffener rigidly attached to the right panel near a right point of attachment to the body of an automobile suspension;
   (e) a left damper stiffener extension extending from rigid attachment to the left damper stiffener to rigid attachment to a body member positioned rearward of the damper stiffener, wherein the body member is a side panel outer extension;
   (f) a right damper stiffener extension extending from rigid attachment to the right damper stiffener to rigid attachment to a body member positioned rearward of the damper stiffener.

3. An automobile body having improved resistance to torsional deformation, the body comprising:
   (a) a left panel on a left side of the automobile;
   (b) a right panel on a right side of the automobile;
   (c) a left damper stiffener rigidly attached to the left panel near a left point of attachment to the body of an automobile suspension;
   (d) a right damper stiffener rigidly attached to the right panel near a right point of attachment to the body of an automobile suspension;
   (e) a left damper stiffener extension extending from rigid attachment to the left damper stiffener to rigid attachment to a body member positioned rearward of the damper stiffener, wherein the body member includes a side panel outer extension and a side panel outer;
   (f) a right damper stiffener extension extending from rigid attachment to the right damper stiffener to rigid attachment to a body member positioned rearward of the damper stiffener.

4. An automobile body having improved resistance to torsional deformation, the body comprising:

(a) a left panel on a left side of the automobile;

(b) a right panel on a right side of the automobile;

(c) a left damper stiffener rigidly attached to the left panel near a left point of attachment to the body of an automobile suspension;

(d) a right damper stiffener rigidly attached to the right panel near a right point of attachment to the body of an automobile suspension;

(e) a left damper stiffener extension extending from rigid attachment to the left damper stiffener to rigid attachment to a body member positioned rearward of the damper stiffener, wherein the body member is a rear panel;

(f) a right damper stiffener extension extending from rigid attachment to the right damper stiffener to rigid attachment to a body member positioned rearward of the damper stiffener.

5. An automobile body having improved resistance to torsional deformation, the body comprising:

(a) a left panel on a left side of the automobile;

(b) a right panel on a right side of the automobile;

(c) a left damper stiffener rigidly attached to the left panel near a left point of attachment to the body of an automobile suspension;

(d) a right damper stiffener rigidly attached to the right panel near a right point of attachment to the body of an automobile suspension;

(e) a left damper stiffener extension extending from rigid attachment to the left damper stiffener to rigid attachment to a body member positioned rearward of the damper stiffener, wherein the body member is a floor frame member;

(f) a right damper stiffener extension extending from rigid attachment to the right damper stiffener to rigid attachment to a body member positioned rearward of the damper stiffener.

6. The automobile body in accordance with claim 5, wherein the body member further comprises a rear panel.

7. An automobile body having improved resistance to torsional deformation, the body comprising:

(a) a rear inner panel on a left side of the automobile;

(b) a rear inner panel on a right side of the automobile;

(c) a left damper stiffener rigidly attached to the left rear inner panel near a left point of attachment to the body of an automobile suspension;

(d) a right damper stiffener rigidly attached to the right rear inner panel near a right point of attachment to the body of an automobile suspension;

(e) a left damper stiffener extension extending from rigid attachment to the left damper stiffener to rigid attachment to a body member positioned rearward of the damper stiffener, wherein the body member is a side panel outer;

(f) a right damper stiffener extension extending from rigid attachment to the right damper stiffener to rigid attachment to a body member positioned rearward of the damper stiffener; and (g) a box-beam panel shelf rigidly mounted at a left side to the left rear inner panel and at a right side to the right rear inner panel.

8. The automobile body in accordance with claim 7, wherein the box-beam parcel shelf further comprises first, second, third and fourth panel members, each panel member having lateral edges, and said panel members being joined at lateral edges to one of said lateral edges of an adjacent panel member to form walls of the box-beam parcel shelf.

9. The automobile body in accordance with claim 8, wherein the first and second panel members are spaced substantially from one another, and the third and fourth panel members are spaced substantially from one another.

10. An automobile body having improved resistance to torsional deformation, the body comprising:

(a) a rear inner panel on a left side of the automobile;

(b) a rear inner panel on a right side of the automobile;

(c) a left damper stiffener rigidly attached to the left rear inner panel near a left point of attachment to the body of an automobile suspension;

(d) a right damper stiffener rigidly attached to the right rear inner panel near a right point of attachment to the body of an automobile suspension;

(e) a left damper stiffener extension extending from rigid attachment to the left damper stiffener to rigid attachment to a body member positioned rearward of the damper stiffener, wherein the body member is a side panel outer extension;

(f) a right damper stiffener extension extending from rigid attachment to the right damper stiffener to rigid attachment to a body member positioned rearward of the damper stiffener; and (g) a box-beam panel shelf rigidly mounted at a left side to the left rear inner panel and at a right side to the right rear inner panel.

11. The automobile body in accordance with claim 10, wherein the box-beam parcel shelf further comprises first, second, third and fourth panel members, each panel member having lateral edges, and said panel members being joined at lateral edges to one of said lateral edges of an adjacent panel member to form walls of the box-beam parcel shelf.

12. An automobile body having improved resistance to torsional deformation, the body comprising:

(a) a rear inner panel on a left side of the automobile;

(b) a rear inner panel on a right side of the automobile;

(c) a left damper stiffener rigidly attached to the left rear inner panel near a left point of attachment to the body of an automobile suspension;

(d) a right damper stiffener rigidly attached to the right rear inner panel near a right point of attachment to the body of an automobile suspension;

(e) a left damper stiffener extension extending from rigid attachment to the left damper stiffener to rigid attachment to a body member positioned rearward of the damper stiffener, wherein the body member is a side panel outer extension and a side panel outer;

(f) a right damper stiffener extension extending from rigid attachment to the right damper stiffener to rigid attachment to a body member positioned rearward of the damper stiffener; and (g) a box-beam panel shelf rigidly mounted at a left side to the left rear inner panel and at a right side to the right rear inner panel.

13. The automobile body in accordance with claim 12, wherein the box-beam parcel shelf further comprises first, second, third and fourth panel members, each panel member having lateral edges, and said panel members being joined at lateral edges to one of said lateral edges of an adjacent panel member to form walls of the box-beam parcel shelf.

14. An automobile body having improved resistance to torsional deformation, the body comprising:
   (a) a rear inner panel on a left side of the automobile;
   (b) a rear inner panel on a right side of the automobile;
   (c) a left damper stiffener rigidly attached to the left rear inner panel near a left point of attachment to the body of an automobile suspension;
   (d) a right damper stiffener rigidly attached to the right rear inner panel near a right point of attachment to the body of an automobile suspension;
   (e) a left damper stiffener extension extending from rigid attachment to the left damper stiffener to rigid attachment to a body member positioned rearward of the damper stiffener, wherein the body member is a rear panel;
   (f) a right damper stiffener extension extending from rigid attachment to the right damper stiffener to rigid attachment to a body member positioned rearward of the damper stiffener; and
   (g) a box-beam panel shelf rigidly mounted at a left side to the left rear inner panel and at a right side to the right rear inner panel.

15. The automobile body in accordance with claim 14, wherein the box-beam parcel shelf further comprises first, second, third and fourth panel members, each panel member having lateral edges, and said panel members being joined at lateral edges to one of said lateral edges of an adjacent panel member to form walls of the box-beam parcel shelf.

16. An automobile body having improved resistance to torsional deformation, the body comprising:
   (a) a rear inner panel on a left side of the automobile;
   (b) a rear inner panel on a right side of the automobile;
   (c) a left damper stiffener rigidly attached to the left rear inner panel near a left point of attachment to the body of an automobile suspension;
   (d) a right damper stiffener rigidly attached to the right rear inner panel near a right point of attachment to the body of an automobile suspension;
   (e) a left damper stiffener extension extending from rigid attachment to the left damper stiffener to rigid attachment to a body member positioned rearward of the damper stiffener, wherein the body member is a floor frame member;
   (f) a right damper stiffener extension extending from rigid attachment to the right damper stiffener to rigid attachment to a body member positioned rearward of the damper stiffener; and
   (g) a box-beam panel shelf rigidly mounted at a left side to the left rear inner panel and at a right side to the right rear inner panel.

17. The automobile body in accordance with claim 16, wherein the body member further comprises a rear panel.

18. The automobile body in accordance with claim 16, wherein the box-beam parcel shelf further comprises first, second, third and fourth panel members, each panel member having lateral edges, and said panel members being joined at lateral edges to one of said lateral edges of an adjacent panel member to form walls of the box-beam parcel shelf.

* * * * *